UNITED STATES PATENT OFFICE.

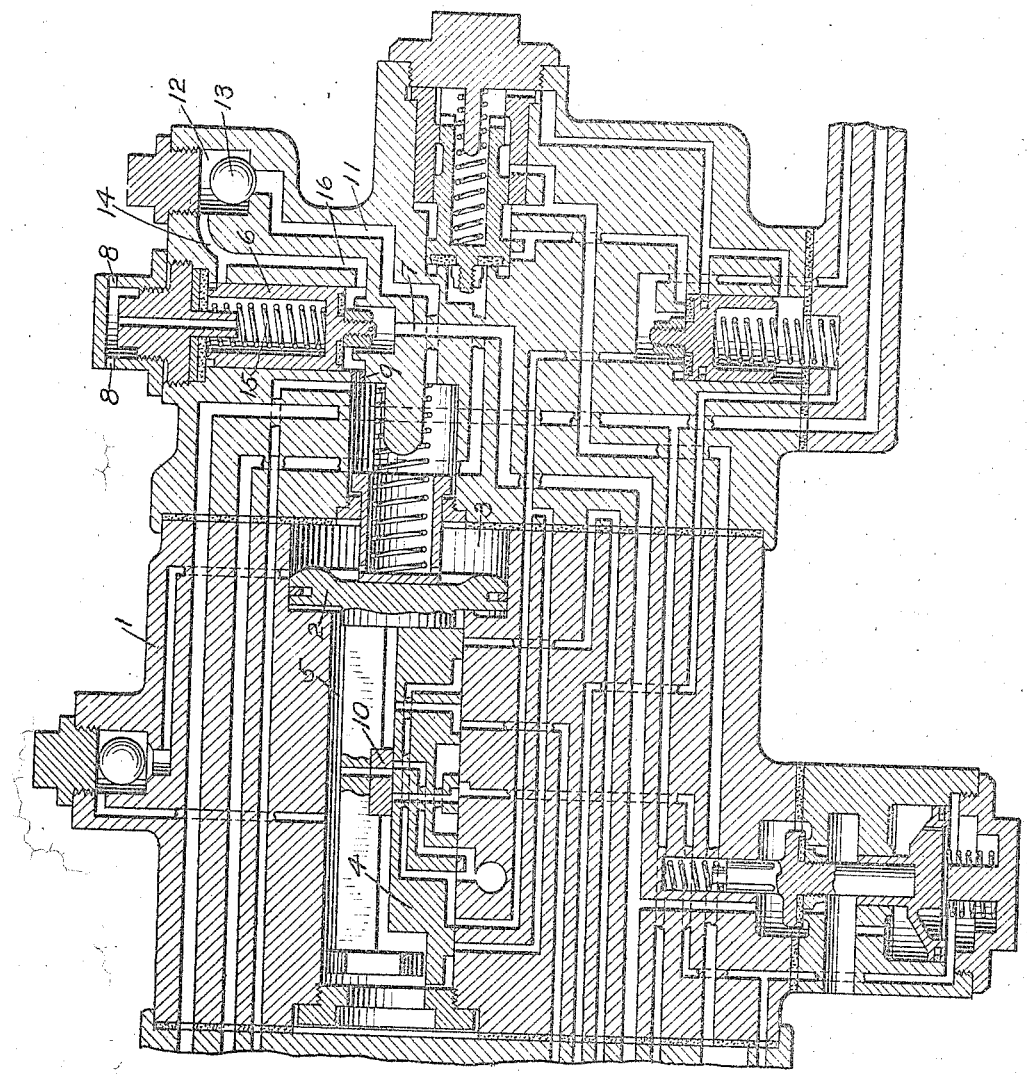

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,243,012.   Specification of Letters Patent.   Patented Oct. 16, 1917.

Application filed January 28, 1916. Serial No. 74,726.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to an emergency valve mechanism for effecting an emergency application of the brakes.

It has been proposed to employ a so-called protection valve device in connection with an emergency valve mechanism for effecting an emergency reduction in pressure on the emergency valve piston when the brake pipe pressure falls to a predetermined degree either through leakage or otherwise.

If a car equipped with an apparatus of this character is isolated, the brake pipe pressure will eventually leak down, and through the action of the protection valve will cause the movement of the emergency valve mechanism to application position. When the car is again coupled to a charged train, the brake pipe air will rush to this car and cause the particular valve to lift and admit brake pipe pressure to the emergency valve piston. The piston will then be shifted to release position, and in some cases, with such momentum as to cause distortion of the piston by sudden engagement with the slide valve bush.

The principal object of my invention is to provide means for obviating the above difficulty.

In the accompanying drawing, the single figure is a central sectional view of the emergency valve portion of a brake controlling valve device embodying my improvement.

The construction shown comprises a casing 1 containing an emergency valve mechanism comprising a piston 2 mounted in piston chamber 3, a slide valve 4, and an auxiliary valve 10 contained in valve chamber 5.

A protection valve device 6 controls communication from brake pipe passage 7 to emergency piston chamber 3 and also from said chamber to atmospheric exhaust port 8.

According to my improvement, communication for supplying fluid from the brake pipe to the piston chamber 3 is restricted, and for this purpose, a choke plug 9, having a restricted port therein, is interposed between the brake pipe passage 7 and the emergency piston chamber 3 and in order to provide a free flow from said emergency valve mechanism to the atmosphere when the protection valve device is operated under a reduction in brake pipe pressure, an additional passage 11 is provided, which leads from piston chamber 3 to a check valve chamber 12 containing a ball check valve 13. A port 14 leads from the check valve chamber 12 to the protection valve device 6 and is adapted to communicate with exhaust ports 8 when the protection valve is operated.

In operation, when fluid is supplied to the brake pipe, air flows through passage 7 to the seat of protection valve 6 and when the pressure rises to a degree sufficient to overcome the resistance of spring 15, the protection valve 6 is lifted from its seat, so that fluid from the brake pipe can flow through the restricted port in the choke plug 9 to the emergency valve chamber 3. As the only communication for supplying fluid from the brake pipe to the emergency valve chamber is by way of the restricted port in the choke plug, it will be seen that in the event of a car being isolated, if the brake pipe pressure leaks down and causes the protection valve to effect a reduction in pressure in emergency valve chamber 3, so as to shift the piston 2 to application position, then when the car is again coupled up to a charged train, fluid will be prevented from passing to the emergency valve chamber at a sudden rate and thus danger of distorting the piston by impact with the valve bush is avoided.

When the brake pipe pressure falls to a predetermined degree, the protection valve device will be operated by the spring 15, so as to open the port 14 and permit the venting of fluid from the emergency piston chamber 3 to the atmosphere, through passage 11 and past check valve 13 and fluid is also vented from the brake pipe through passage 16 during the movement of the protection valve, but as soon as this valve seats further venting of fluid from the brake pipe is prevented, while the venting of fluid from the emergency valve chamber continues through passage 11.

Having now described my invention, what

I claim as new and desire to secure by Letters Patent, is:

1. In a fluid pressure brake, the combination with a brake pipe and an emergency valve mechanism operated upon a reduction in brake pipe pressure for effecting an emergency application of the brakes, of a protection valve device for venting fluid from said valve mechanism through a large opening and controlling a restricted communication for supplying fluid from the brake pipe to said emergency valve mechanism.

2. In a fluid pressure brake, the combination with a brake pipe and an emergency valve mechanism operated upon a reduction in brake pipe pressure for effecting an emergency application of the brakes, of a protection valve device operated upon a predetermined reduction in brake pipe pressure for venting fluid at a rapid rate from said emergency valve mechanism to operate same and adapted to control a restricted communication for supplying fluid from the brake pipe to said valve mechanism.

3. In a fluid pressure brake, the combination with a brake pipe and an emergency valve mechanism operated upon a reduction in brake pipe pressure for effecting an emergency application of the brakes, of a protection valve device operated upon a predetermined increase in brake pipe pressure for supplying fluid from the brake pipe to said emergency valve mechanism through a restricted passage and upon a predetermined reduction in brake pipe pressure for venting fluid from said emergency valve mechanism through a large passage.

4. In a fluid pressure brake, the combination with a brake pipe and an emergency valve mechanism operated upon a reduction in brake pipe pressure for effecting an emergency application of the brakes, of a protection valve device operated upon a predetermined increase in brake pipe pressure for supplying fluid from the brake pipe to said emergency valve mechanism through a restricted passage and upon a predetermined reduction in brake pipe pressure for venting fluid from said emergency valve mechanism through a large passage containing a check valve for preventing flow in the opposite direction.

In testimony whereof I have hereunto set my hand.

WALTER V. TURNER.